US009837949B2

(12) United States Patent
Kumamoto et al.

(10) Patent No.: US 9,837,949 B2
(45) Date of Patent: Dec. 5, 2017

(54) MOTOR DRIVING DEVICE INCLUDING INITIAL CHARGING UNIT

(71) Applicant: FANUC CORPORATION, Yamanashi (JP)

(72) Inventors: Yuuki Kumamoto, Yamanashi (JP); Yasuyuki Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/173,785

(22) Filed: Jun. 6, 2016

(65) Prior Publication Data
US 2016/0365820 A1    Dec. 15, 2016

(30) Foreign Application Priority Data

Jun. 12, 2015 (JP) .................................. 2015-119690
Feb. 19, 2016 (JP) .................................. 2016-029959

(51) Int. Cl.
| | |
|---|---|
| *G01R 31/02* | (2006.01) |
| *H02P 27/08* | (2006.01) |
| *H02P 29/032* | (2016.01) |
| *H02P 1/54* | (2006.01) |

(52) U.S. Cl.
CPC ............ *H02P 27/08* (2013.01); *H02P 29/032* (2016.02); *H02P 1/54* (2013.01)

(58) Field of Classification Search
CPC ............ H02M 5/00; H02P 1/54; H02P 29/032
See application file for complete search history.

(56) References Cited

U.S. PATENT DOCUMENTS

2011/0175557 A1*  7/2011  Iwashita .................. H02P 23/06
                                                                 318/400.3

FOREIGN PATENT DOCUMENTS

| JP | 6311639 A | 11/1994 |
|---|---|---|
| JP | 10191639 A | 7/1998 |

OTHER PUBLICATIONS

English Abstract for Japanese Publication No. JPH06311639 published Nov. 4, 1994, 2 pgs.
English Abstract and Machine Translation for Japanese Publication No. 10-191639 A, published Jul. 21, 1998, 9 pgs.

* cited by examiner

*Primary Examiner* — Karen Masih
(74) *Attorney, Agent, or Firm* — Fredrikson & Byron, P.A.

(57) ABSTRACT

A motor driving device includes: a rectifier that rectifies an AC current and outputs a DC current to a DC link; an inverter unit that converts the DC current to an AC current for a motor; an initial charging unit that initially charges a smoothing capacitor with the DC current that flows through a charging resistor; a storage unit that stores a load capability of the charging resistor; a power calculation unit that calculates an amount of power generated in the charging resistor in response to the DC current flowing therethrough; and an opening/closing unit that shuts off the DC current from flowing in the smoothing capacitor when the amount of power reaches the load capability during an initial charging period and allows the DC current to flow in the smoothing capacitor after the shutoff when the amount of power is smaller than or equal to a threshold value.

8 Claims, 7 Drawing Sheets

PRIOR ART

FIG. 8

MOTOR DRIVING DEVICE INCLUDING INITIAL CHARGING UNIT

BACKGROUND OF THE INVENTION

1. Field of the Invention

The present invention relates to a motor driving device in which a AC current supplied from an AC power supply is converted to a DC current which in turn is outputted to a DC link and then converted to an AC current for driving a motor and the AC current is supplied to the motor, and more In particular it pertains to a motor driving device including an initial charging unit that initially charges a smoothing capacitor provided in a DC link.

2. Description of the Related Art

In a motor driving device for driving a motor in a machine tool, a forging press, an injection molding machine, an industrial machine, or various types of robots, AC power inputted from an AC power supply side is converted to DC power and then re-converted to AC power, and the AC power is used as driving power for a motor provided for each drive shaft. Such a motor driving device includes a rectifier that rectifies AC power supplied from an AC power supply side where there is a three-phase AC input power supply and outputs DC power, and an inverter unit that is connected to DC link (direct current link) which is the DC output side of the rectifier and performs mutual power conversion between the DC power of the DC link and the AC power which is driving power or regenerative power of the motor, thereby controlling the speed, torque, or position of the rotor of the motor connected to the AC output side of the inverter. To individually supply driving power to each motor provided respectively in correspondence to a plurality of drive shafts, thereby driving and controlling the motors, the inverter unit is provided by a number equal to the number of the motors. The rectifier is usually provided one for the plurality of inverter units for the purpose of reducing the cost and occupancy space of the motor driving device.

For example, as described in Japanese Unexamined Patent Publication No. H06-311639, a smoothing capacitor (referred to also as "DC link capacitor") is provided on the DC link side of the inverter unit to which the rectifier is connected. The smoothing capacitor has the function of restraining a pulsating component of the DC output of a converter and is capable of accumulating DC power. Since it is preferable that the smoothing capacitor be subjected to initial charging (referred to also as "preliminary charging") between immediately after the motor driving device is started and before driving of the motor is started (i.e., before power conversion operation by the inverter unit is started), it is common that an initial charging unit therefor is provided.

Figure 8:
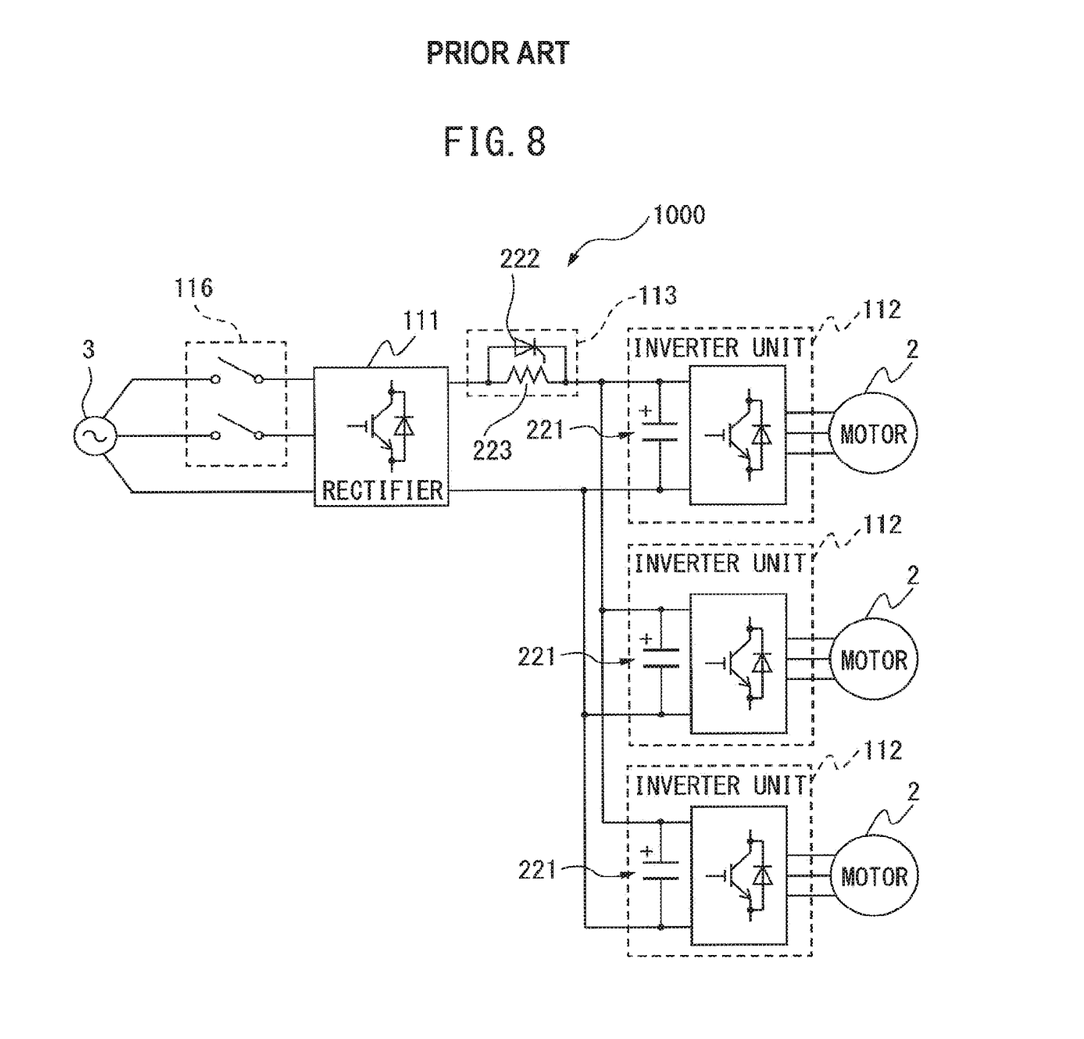
FIG. 8 is a view illustrating a configuration of a general motor driving device.

FIG. 8 is a view illustrating a configuration of a general motor driving device. The motor driving device 1000 includes a rectifier 111 that rectifies AC power from a commercial three-phase AC power supply 3 and outputs DC power, and an inverter unit 112 that is connected to a DC link, which is the DC side of the rectifier 111, and converts the DC power outputted from the rectifier 111 to AC power of a desired voltage and a desired frequency supplied as driving power of a motor 2 or converts AC power regenerated from the motor 2 to DC power, thereby controlling a speed, a torque, or a position of a rotor of the motor 2 connected to the AC side of the inverter unit 112.

To individually supply driving power to each of motors 2 provided respectively in correspondence to a plurality of drive shafts, thereby driving and controlling the motors 2, the inverter unit 112 is provided by a number equal to the number of the motors 2 and connected in parallel to each other. A smoothing capacitor 221 is provided on the DC input side of each inverter unit 112. In other words, the smoothing capacitor 221 is located on the DC link side of the inverter unit 112 to which the rectifier 111 is connected. In FIG. 8, the number of the motors 2 is three by way of example, and hence the number of the inverter units 112 is three. The rectifier 111 is provided one for the plurality of inverter units 112 for the purpose of reducing the cost and the occupancy space of the motor driving device 1000.

It is preferable that the smoothing capacitor 221 be subjected to initial charging between immediately after the motor driving device 1000 is started (i.e., immediately after the opening/closing unit 116 is closed (on)) and before driving of the motor 2 is started (i.e., before power conversion operation by the inverter unit 112 is started). A large inrush current flows through the rectifier 111 between a state in which no energy is accumulated in the smoothing capacitor 221 and immediately after initial charging is started. In particular, the larger the electrostatic capacitance of the smoothing capacitor 221, the larger inrush current occurs. To countermeasure such inrush current, the motor driving device 1000 is commonly provided with an initial charging unit 113 between the rectifier 111 and the smoothing capacitor 221 in the inverter unit 112. For example, as illustrated in FIG. 8, when a plurality of the inverter units 112 are connected in parallel to each other, the smoothing capacitors 221 are also connected in parallel to each other correspondingly, but the initial charging unit 113 is provided one between the rectifier 111 and the smoothing capacitors 221.

The initial charging unit 113 includes a switch 222 and a charging resistor 223 connected in parallel to the switch 222. The switch 222 is opened (off) only during the initial charging period of the smoothing capacitor 221 immediately after the motor driving device 1000 is started, and maintains a state in which it is closed (on) during the normal operating period for which the motor driving device 1000 drives the motor 2. An example of the switch 222 includes, for example, a thyristor. More specifically, during the initial charging period between immediately after the motor driving device 1000 is started and before driving of the motor 2 is started, upon the switch 222 being opened (off), a DC current outputted from the rectifier 111 flows in the smoothing capacitor 221 through the charging resistor 223, and thus the smoothing capacitor 221 is charged. When the smoothing capacitor 221 is charged to a predetermined voltage, the switch 222 is closed (on), and thus the opposite ends of the charging resistor 223 are short-circuited, and thus the initial charging operation is completed. Thereafter, the inverter unit 112 starts a power conversion operation and supplies driving power to the motor 2, and the motor 2 is driven based on the driving power.

As described above, during the initial charging period of the smoothing capacitor 221, upon the switch 222 being opened (off), the DC power outputted from the rectifier 111 flows through the charging resistor 223 and is consumed as heat in the charging resistor 223, and thus occurrence of an excessive inrush current during the initial charging period is restrained. However, the charging resistor 223 has instantaneous load capability (hereinafter, referred to simply as "load capability") defined as an amount of heat that it can withstand being fused off, and hence when an amount of heat generated due to a current flowing through the charging resistor 223 exceeds the load capability, the charging resistor 223 will be fused off.

Since the DC current that flows through the charging resistor 223 during the initial charging period depends on the electrostatic capacitance of the smoothing capacitor 221 and the amount of heat generated in the charging resistor 223 depends on the DC current flowing through the charging resistor 223, the load capability of the charging resistor 223 that can be provided in the motor driving device 1000 is determined depending on a maximum electrostatic capacitance of the smoothing capacitor 221. For example, in a system that the electrostatic capacitance of the smoothing capacitor 221 is large, it is preferable to use a resistor having a large rated power as the charging resistor 223. As illustrated in FIG. 8, when a plurality of the inverter units 112 are connected in parallel to each other, a plurality of the smoothing capacitors 221 are also correspondingly in a parallel-connected relationship with each other, and hence, in such an instance, the load capability of the charging resistor 223 is determined depending on a combined capacitance of the electrostatic capacitances of all the smoothing capacitors 221. Therefore, when designing the motor driving device, the designer usually selects the charging resistor that can be provided in the motor driving device, based on the maximum electrostatic capacitance of the smoothing capacitor and taking into account of the relationship between the load capability of the charging resistor and the maximum capacitance of the smoothing capacitor that can be provided under the load capability.

Even in a case in which the charging resistor that can be provided in the motor driving device is selected based on the electrostatic capacitance of the smoothing capacitor, when the time taken for initial charging of the smoothing capacitor is longer for some reason, there is a possibility that since an amount of heat generated due to a current flowing through the charging resistor exceeds the load capability, the charging resistor will be fused off. In particular, when the plurality of inverter units are connected in parallel to each other, the plurality of smoothing capacitors are also connected in parallel to each other, and in such a case, there is a tendency that the time taken for initial charging of the smoothing capacitors is longer, and thus there is a high possibility that the charging resistor will be fused off.

Further, as described above, when designing the motor driving device, the designer selects the charging resistor that can be provided in the motor driving device, based on the maximum electrostatic capacitance of the smoothing capacitor. Thus, when the maximum electrostatic capacitance of the smoothing capacitor is large, such as for example when a plurality of the inverter units are connected in parallel to each other and a plurality of the smoothing capacitors are also connected in parallel to each other, it is preferable to select a charging resistor having high load capability, and thus there is a problem in which the cost of the motor driving device is increased and the motor driving device is large-sized.

Further, when a substitution is made with inverter units each including a smoothing capacitor having a higher electrostatic capacitance or an additional inverter unit or inverter units are added by reason of later maintenance or design change, it is likely that a combined capacitance of the electrostatic capacitances of the plurality of smoothing capacitors exceeds the maximum capacitance of the smoothing capacitor which is determined based on the load capability of the charging resistor which is already in use. In this case as well, the time taken for initial charging of the smoothing capacitor is longer, and there is a possibility that since the amount of heat generated due to a current flowing through the charging resistor exceeds the load capability, the charging resistor will be fused off.

SUMMARY OF INVENTION

In consideration of the problems described above, it is an object of the present invention to provide a small-size and low-cost motor driving device capable of securely protecting an initial charging unit used for initial charging of a smoothing capacitor provided in a DC link.

In order to realize the above-described object, the motor driving device includes: a rectifier that rectifies AC current supplied from an AC power supply side and outputs DC current to a DC link which is a DC side; an inverter unit that includes a smoothing capacitor on the DC link side to which the rectifier is connected and converts the DC current from the rectifier to output AC current for motor drive; an initial charging unit provided at the DC link and including a switch and a charging resistor connected in parallel to the switch, the initial charging unit being configured, during an initial charging period before starting the motor drive, to initially charge the smoothing capacitor up to a predetermined voltage with the DC current from the rectifier which flows through the charging resistor in response to the switch being opened; a storage unit that stores a resistance value of the charging resistor and a load capability which is pre-defined as an amount of power for causing the charging resistor to be fused off; a power calculation unit that calculates an average amount of power during a given time interval which is generated in the charging resistor due to the DC current from the rectifier flowing therethrough; and an opening/closing unit configured, during the initial charging period, to shut off the DC current from the rectifier from flowing in the smoothing capacitor when the average amount of power calculated by the power calculation unit reaches the load capability and, after the shutoff, to allow the DC current from the rectifier to flow in the smoothing capacitor when the average amount of power calculated by the power calculation unit is smaller than or equal to a predetermined threshold value.

Further, the motor driving device may further include a DC voltage detection unit that detects a DC voltage value of the DC link, and the power calculation unit may be configured to calculate the average amount of power generated in the charging resistor based on the DC voltage value detected by the DC voltage detection unit and the resistance value of the charging resistor.

Further, the motor driving device may further include a DC current detection unit that detects a DC current value of the DC link, and the power calculation unit may be configured to calculate an average amount of power generated in the charging resistor based on the current value detected by the DC current detection unit and the resistance value of the charging resistor.

Further, the motor driving device may further include an AC voltage detection unit that detects an AC voltage value at an AC power supply side of the rectifier, and the power calculation unit may be configured to calculate an average amount of power generated in the charging resistor based on the AC voltage value detected by the AC voltage detection unit, the resistance value of the charging resistor, and the electrostatic capacitance of the smoothing capacitor.

The opening/closing unit may be provided at AC power supply side input ends of the rectifier, and may be configured, during the initial charging period, to shut off the DC current from the rectifier from flowing in the smoothing capacitor by opening current paths between the AC power supply and the rectifier to shut off the AC current supplied from the AC power supply side to the rectifier when the average amount of power calculated by the power calculation unit reaches the load capability, and, after the AC current is shut off, the DC current from the rectifier is allowed to flow in the smoothing capacitor by closing the current paths between the AC power supply and the rectifier to allow the AC current be supplied from the AC power supply side to the rectifier, when the average amount of power calculated by the power calculation unit is smaller than or equal to a predetermined threshold value.

Further, alternatively, the opening/closing unit may be provided on current paths between the rectifier and the initial charging unit, and may be configured, during the initial charging period, to shut off the DC current from the rectifier from flowing in the smoothing capacitor by opening the current paths between the rectifier and the initial charging unit when the average amount of power calculated by the power calculation unit reaches the load capability, and, after the shutoff, to allow the DC current from the rectifier to flow in the smoothing capacitor by closing the current paths between the rectifier and the initial charging unit when the average amount of power calculated by the power calculation unit is smaller than or equal to the predetermined threshold value.

Further, alternatively, the opening/closing unit may be provided on current paths between the initial charging unit and the inverter unit, and may be configured, during the initial charging period, to shut off the DC current from the rectifier from flowing in the smoothing capacitor by opening the current paths between the initial charging unit and the inverter unit when the average amount of power calculated by the power calculation unit reaches the load capability, and, after the shutoff, to allow the DC current from the rectifier to flow in the smoothing capacitor by closing the current paths between the initial charging unit and the inverter unit when the average amount of power calculated by the power calculation unit is smaller than or equal to a predetermined threshold value.

The opening/closing unit may include any of an electromagnetic contactor, a relay, or a semiconductor switching element to close or open the current paths.

BRIEF DESCRIPTION OF THE DRAWINGS

The present invention will be more clearly understood by reference to the accompanying drawings, in which.

DETAILED DESCRIPTION

A motor driving device including an initial charging unit will be described below with reference to the drawings. However, it should be understood that the present invention is not limited to the drawings or the following embodiment.

Figure 1:
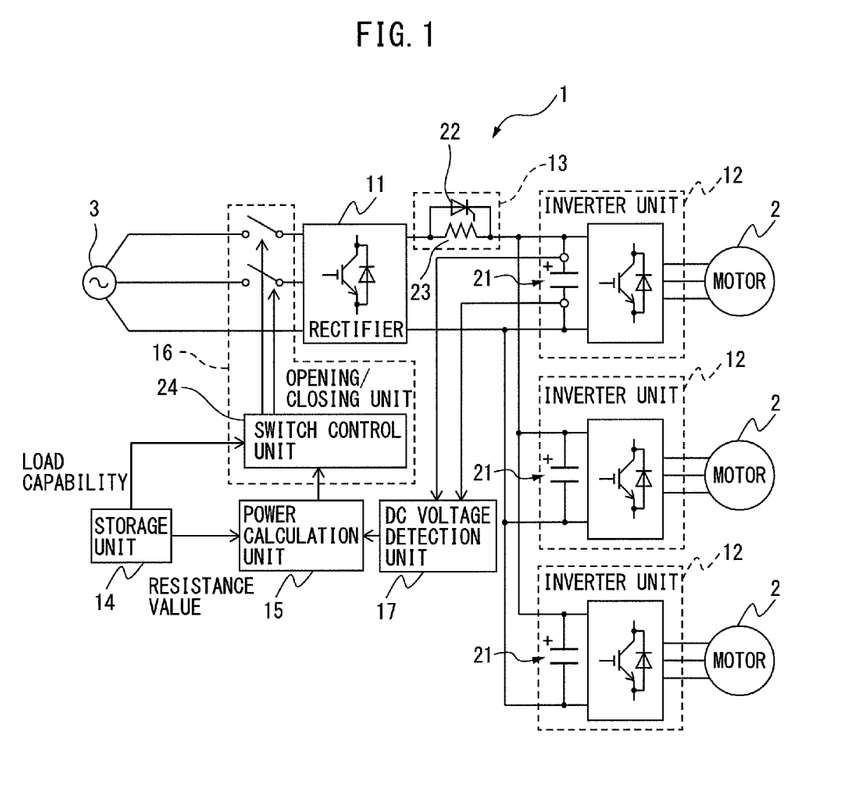
FIG. 1 is a principle block diagram of the motor driving device according to a first embodiment.

FIG. 1 is a view illustrating a configuration of the motor driving device according to a first embodiment. An AC power supply 3 is connected to a commercial three-phase AC input side of the motor driving device 1, and three-phase AC motors 2 are connected to an AC motor side of the motor driving device 1. While description is made herein of the motor driving device 1 that drives and controls the three motors 2, the number of the motors 2 which are driven and controlled by the motor driving device 1 does not specially limit the present invention and may be single or plural. Further, while, in the embodiments described hereinbelow, both the AC power supply 3 and the AC motors 2 which are connected to the motor driving device 1 are assumed to be three-phase, the number of phases does not specially limit the present invention and may be, for example, a single phase. Further, the type of the motor 2 to be driven by the motor driving device 1 also does not specially limit the present invention and may be, for example, either an induction motor or a synchronous motor.

As illustrated in FIG. 1, the motor driving device 1 according to the first embodiment includes: a rectifier 11; inverter units 12 each including a smoothing capacitor 21; an initial charging unit 13 including a switch 22 and a charging resistor 23; a storage unit 14, a power calculation unit 15; an opening/closing unit 16; and a DC voltage detection unit 17.

The rectifier 11 rectifies AC current supplied from the AC power supply 3 side and outputs DC current to the DC link which is at the DC side. In the present invention, the embodiment of the rectifier 11 to be used is not specially limited but may include, for example, a diode rectifier or a PWM control type rectifier provided inside with a semiconductor switching element. The rectifier 11, when being a PWM control type rectifier, is configured from a bridge circuit of a semiconductor switching element and a diode connected in anti-parallel to the semiconductor switching element. In such an instance, while examples of the semiconductor switching element include IGBT, thyristor, GTO (Gate Turn-Off thyristor), transistor or the like, the present invention is not limited by the type itself of the semiconductor switching element, but may use any other type of semiconductor switching element.

The inverter unit 12 converts a DC current from the rectifier 11 and outputs an AC current for motor drive. The inverter unit 12 is configured from a bridge circuit of a switching element and a diode connected in anti-parallel to the switching element such, for example, as a PWM inverter. While examples of the switching element include IGBT, thyristor, GTO (Gate Turn-Off thyristor), transistor or the like, the present invention is not limited by the type itself of the semiconductor switching element, but may use another other type of semiconductor switching element. The inverter unit 12 converts DC power supplied from the DC link side to three-phase AC power of a desired voltage and a desired frequency for causing the internal switching element to perform a switching operation based on a motor driving command received from an upper control device (not illustrated) and driving the motor 2. The motor 2 operates based on the supplied three-phase AC power having a variable voltage and a variable frequency. Further, regenerative power is generated during deceleration of the motor 2, and the AC generative power generated at the motor 2 is converted to DC power based on a motor driving command received from the upper control device, and returned to the DC link. The inverter unit 12 includes the smoothing capacitor 21 on the DC link side to which is connected the rectifier 11.

The initial charging unit 13 is provided at the DC link which connects the DC output side of the rectifier 11 to the DC input side of the inverter unit 12, and includes a switch 22 and a charging resistor 23 connected in parallel to the switch 22. During initial charging period prior to the initiation of motor drive, the initial charging unit 13 initially charges the smoothing capacitor 21 up to a predetermined voltage with a DC current from the rectifier 11 which is caused to flow through the charging resistor 23 due to the switch 22 being opened. More specifically, the switch 22 is opened (off) only during the initial charging period of the smoothing capacitor 21 after the motor driving device 1 is started, and maintained in a closed (on) state during the normal operation period in which the motor driving device 1 drives the motor 2. An example of the switch 22 is, for example, a thyristor. More specifically, during the initial charging period between after the motor driving device 1 is started and before it starts driving the motor 2, the switch 22 is opened (off), and thus the DC current outputted from the rectifier 11 flows in the smoothing capacitor 21 through the charging resistor 23, and thus the smoothing capacitor 21 is charged. Upon the smoothing capacitor 21 being charged up to a predetermined voltage, the switch 22 is closed (on), and thus the opposite ends of the charging resistor 23 are short-circuited, and thus the initial charging operation is ended. Subsequently, the inverter unit 12 starts a power conversion operation and supplies driving power to the motor 2, and the motor 2 is driven based on the driving power.

The storage unit 14 stores a predetermined load capability as an amount of heat (amount of power) to cause the charging resistor 23 to be fused off. The load capability is defined as the amount of heat (amount of power) for which the charging resistor 23 can withstand being fused off; when the amount of heat generated due to a current flowing through the resistor 23 exceeds the load capability, the resistor 23 will be fused off. Further, the storage unit 14 stores the resistance value of the charging resistor 23.

The power calculation unit 15 calculates an average amount of power during a given time interval which is generated at the charging resistor 23 due to a DC current from the rectifier 11 flowing therethrough. The average amount of power is calculated, for example, based on Simple Moving Average (SMA). A specific example of the calculation process of the average amount of power by the power calculation unit 15 will be described hereinafter.

The opening/closing unit 16, during the initial charging period, shuts off the DC current from the rectifier 11 from flowing in the smoothing capacitor 21 when the average amount of power calculated by the power calculation unit 15 reaches the load capability stored in the storage unit 14, and, after the shutoff, allows the DC current from the rectifier 11 to flow in the smoothing capacitor 21 when the average amount of power calculated by the power calculation unit 15 is smaller than or equal to a predetermined threshold value. In the first embodiment, as illustrated in FIG. 1, the opening/closing unit 16 is provided at AC power supply 3 side input ends of the rectifier 11, and the switch thereof is configured, for example, to shut off two phases of the three phase current paths.

It is performed by a switch control unit 24 in the opening/closing unit 16 to determine whether the average amount of power calculated by the power calculation unit 15 has reached the load capability stored in the storage unit 14 or become smaller than or equal to the predetermined threshold value. The switch control unit 24 closes or opens the current paths depending on a result of the determination. The opening/closing unit 16 includes any of an electromagnetic contactor, a relay, and a semiconductor switching element to close or open the current paths.

During the initial charging period, the opening/closing unit 16 opens the current paths between the AC power supply 3 and the rectifier 11 and shuts off the AC current supplied from the AC power supply 3 side to the rectifier 11, when the average amount of power calculated by the power calculation unit 15 reaches the load capability stored in the storage unit 14. In this manner, no AC current is allowed to flow in the rectifier 11, and thus a rectifying operation is not performed, and consequently, it follows that no DC current flows from the rectifier 11 into the smoothing capacitor 21. Further, after the shutoff, when the average amount of power calculated by the power calculation unit 15 is smaller than or equal to the predetermined threshold value, the opening/closing unit 16 closes the current paths between the AC power supply 3 and the rectifier 11 and allows the AC current to be supplied from the AC power supply 3 side to the rectifier 11. In this manner, a DC current is outputted by the rectifying operation of the rectifier 11, and allowed to flow from the rectifier 11 into the smoothing capacitor 21, and thus as a result the smoothing capacitor 21 is charged.

Figure 2A:
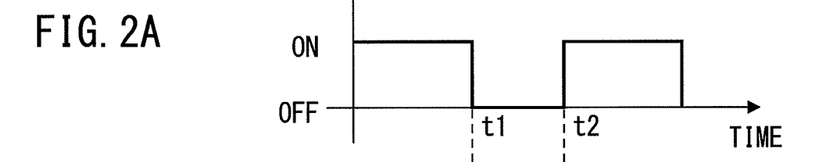
FIG. 2A is a view for explaining an example of the operation of an opening/closing unit in the motor driving device according to a first embodiment, wherein an on/off state of a switch is illustrated.
Figure 2B:
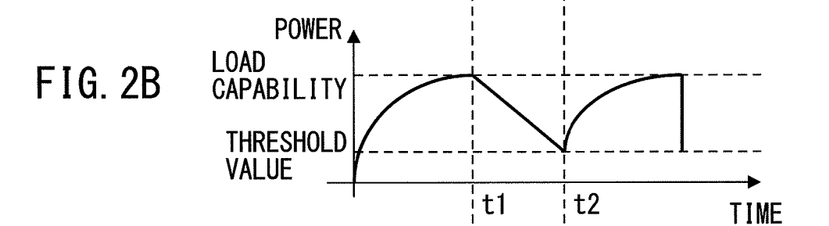
FIG. 2B is a view for explaining an example of the operation of the opening/closing unit in the motor driving device according to the first embodiment, wherein an average power amount calculated by a power calculation unit is illustrated.
Figure 2C:
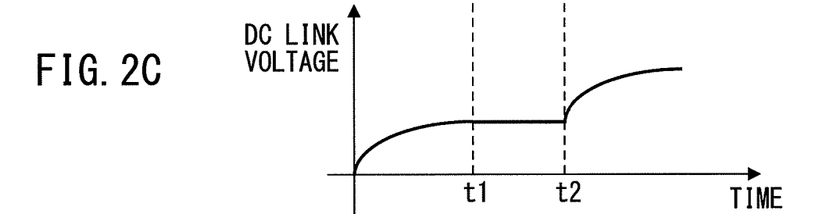
FIG. 2C is a view for explaining an example of the operation of the opening/closing unit in the motor driving device according to the first embodiment, wherein a DC voltage value of a DC link detected by a DC voltage detection unit is illustrated.

FIG. 2A is a view for explaining an example of the operation of the opening/closing unit in the motor driving device according to the first embodiment, wherein an on/off state of the switch is illustrated. FIG. 2B is a view for explaining an example of the operation of the opening/closing unit in the motor driving device according to the first embodiment, wherein the average amount of power calculated by the power calculation unit is illustrated. FIG. 2C is a view for explaining an example of the operation of the opening/closing unit in the motor driving device according to the first embodiment, wherein the DC voltage value of the DC link detected by the DC voltage detection unit is illustrated. For example, as illustrated in FIG. 2A, at a time 0, which is the initial charging starting point, the switch of the opening/closing unit 16 is turned on, and thus the current paths between the AC power supply 3 and the rectifier 11 are closed, and a DC current is outputted by the rectifying operation of the rectifier 11, and the DC current is allowed to flow from the rectifier 11 into the smoothing capacitor 21; thus the smoothing capacitor 21 is charged. Consequently, the DC voltage value of the DC link is increased. At a time $t_1$, when the average amount of power calculated by the power calculation unit 15 exceeds the load capability stored in the storage unit 14, the switch of the opening/closing unit 16 is turned off under control of the switch control unit 24, and thus the current paths between the AC power supply 3 and the rectifier 11 are opened. Consequently, it follows that no AC current flows in the rectifier 11 and thus no rectifying operation is performed, and thus no DC current flows through the charging resistor 23. After the shutoff, at a time $t_2$, when the average amount of power calculated by the power calculation unit 15 goes below the predetermined threshold value, the switch of the opening/closing unit 16 is turned on under control of the switch control unit 24, and thus the current paths between the AC power supply 3 and the rectifier 11 are closed. Consequently, AC current is allowed to flow into the rectifier 11, DC current is outputted by the rectifying operation of the rectifier 11, and the DC current is allowed to flow from the rectifier 11 into the smoothing capacitor 21; thus the smoothing capacitor 21 is charged.

Although, in the first embodiment, the opening/closing unit 16 is provided at the AC power supply 3 side input terminals of the rectifier 11, it is possible as a modification that the opening/closing unit 16 may be provided on the current paths between the rectifier 11 and the initial charging unit 13 or, alternatively, on the current paths between the initial charging unit 13 and the inverter units 12. These will be described hereinafter.

Figure 3:
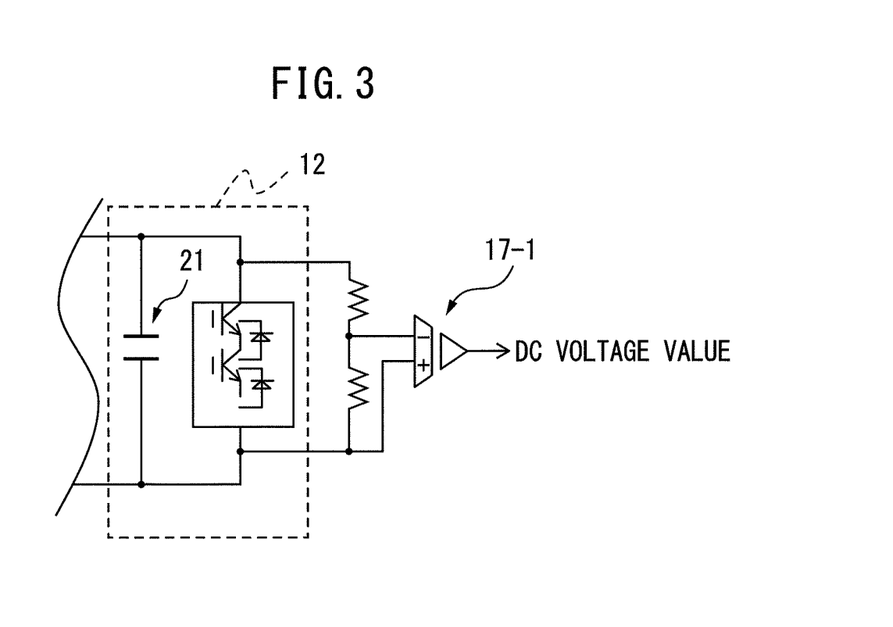
FIG. 3 is a view illustrating an example of the DC voltage detection unit in the first embodiment.

The DC voltage detection unit 17 detects the DC voltage value of the DC link (i.e., the value of the voltage applied across the smoothing capacitor 21). FIG. 3 is a view illustrating an example of the DC voltage detection unit in the first embodiment. As the DC voltage detection unit, use is made, for example, of an isolation amplifier 17-1. In other words, the voltage of the DC link is divided by resistors, and the divided voltage is inputted to the isolation amplifier 17-1. In this manner, the DC voltage value of the DC link is detected from an output signal of the isolation amplifier 17-1.

Description will now be made of the calculation process of the average amount of power by the power calculation unit 15 in the first embodiment. In the first embodiment, the average amount of power during a given period of time which is generated in the charging resistor 23 is calculated based on the DC voltage value detected by the DC voltage detection unit 17 and the resistance value of the charging resistor 23 stored in the storage unit 14.

When it is assumed that the electrostatic capacitance of the smoothing capacitor 21 is C, the amount of charge accumulated in the smoothing capacitor 21 is Q, the DC voltage value detected at a time t by the DC voltage detection unit 17 is $V_{dc}(t)$, and the current flowing through the smoothing capacitor 21 at the time t is i(t), the current i(t) that flows through the smoothing capacitor 21 during an infinitesimal time that is the time interval from the time $t_1$ to the time $t_2$ is represented by the following equation (1):

$$i(t) = \frac{dQ}{dt} \qquad (1)$$
$$= C \frac{V_{dc}(t_2) - V_{dc}(t_1)}{t_2 - t_1}$$

Since the smoothing capacitor 21 and the charging resistor 23 are connected in series with each other, the current flowing through the charging resistor 23 is equal to the current i(t) flowing through the smoothing capacitor 21 which is represented by the equation (1). Therefore, the average amount of power P which is generated in the charging resistor 23 during the time interval from a time $T_1$ to a time $T_2$ is represented by the following equation (2):

$$P = R \frac{\int_{T_1}^{T_2} i(t)^2 \, dt}{T_2 - T_1} \qquad (2)$$

The power calculation unit 15 calculates, based on the DC voltage value $V_{dc}$ detected by the DC voltage detection unit 17 and the resistance value R of the charging resistor 23, the average amount of power P generated in the charging resistor 23 using the equation (2).

Subsequently, description will be made of a second embodiment. In the second embodiment, the average amount of power generated in the charging resistor is calculated based on the DC current value of the DC link detected by a DC current detection unit and the resistance value of the charging resistor.

Figure 4:
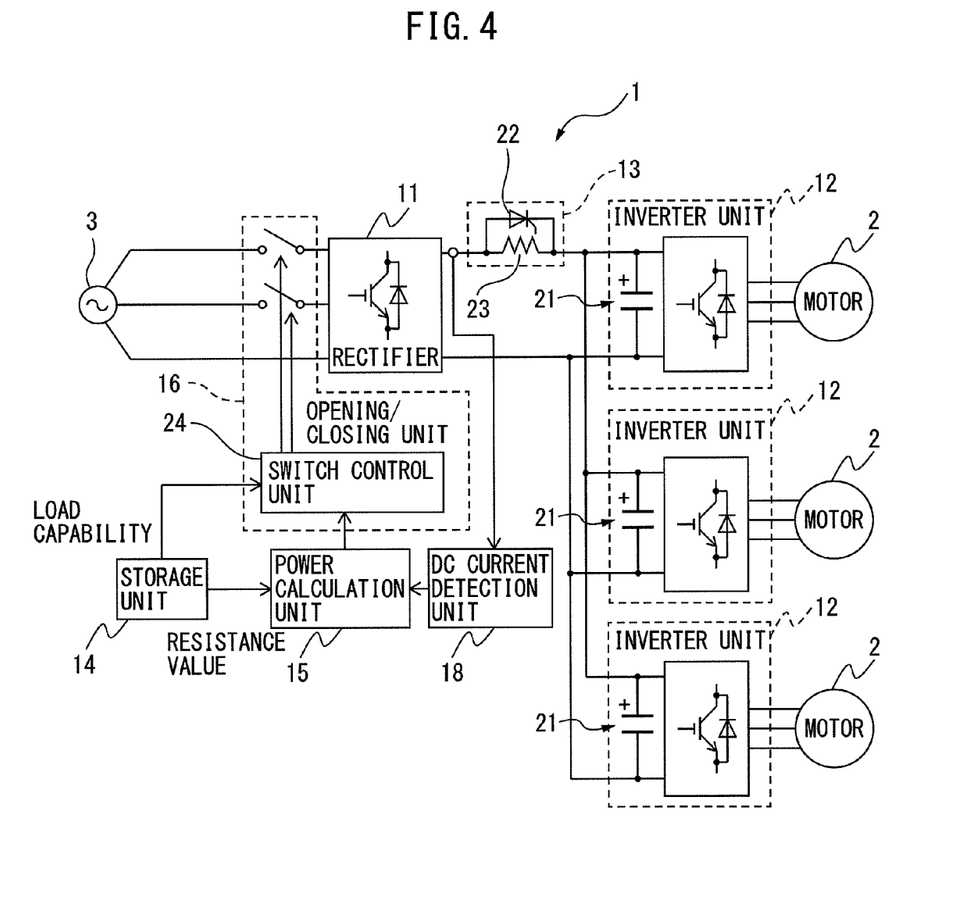
FIG. 4 is a principle block diagram of the motor driving device according to a second embodiment.

FIG. 4 is a view illustrating the configuration of the motor driving device according to the second embodiment. In the second embodiment, the motor driving device 1 further includes the DC current detection unit 18 that detects the DC current value of the DC link. The power calculation unit 15 calculates, based on the DC current value detected by the DC current detection unit 18 and the resistance value of the charging resistor 23 stored in the storage unit 14, the average amount of power during a given time interval generated in the charging resistor 23.

When it is assumed that the DC current value detected by the DC current detection unit 18 at a time t is i(t) and the resistance value of the charging resistor 23 stored in the storage unit 14 is R, the average amount of power P generated in the charging resistor 23 during the time interval from the time $T_1$ to the time $T_2$ is represented by the following equation (3):

$$P = R \frac{\int_{T_1}^{T_2} i(t)^2 \, dt}{T_2 - T_1} \qquad (3)$$

The power calculation unit 15 calculates, based on a DC voltage value I detected by the DC current detection unit 18 and a resistance value R of the charging resistor 23, an average amount of power P generated in the charging resistor 23 in accordance with the equation (3).

The DC current detection unit 18 may be configured, for example, of a Hall element. With the Hall element, it is possible to detect a DC current at a position where it is located. Alternatively, the DC current detection unit 18 may be configured such that a DC current value is calculated by detecting a DC voltage value across the charging resistor 23 by a DC voltage detection unit (not illustrated) and dividing the detected DC voltage value by the stored resistance value of the charging resistor 23. Since in the second embodiment, circuit components other than those described above are similar to the circuit components illustrated in FIG. 1, the same circuit components are denoted by the same reference numerals, and a detailed description of such circuit components are omitted.

Subsequently, description will be made of a third embodiment. In the third embodiment, the average amount of power during a given time interval generated in the charging resistor is calculated based on the AC voltage value at the AC power supply side of the rectifier, the resistance value of the charging resistor, and the electrostatic capacitance of the smoothing capacitor.

Figure 5:
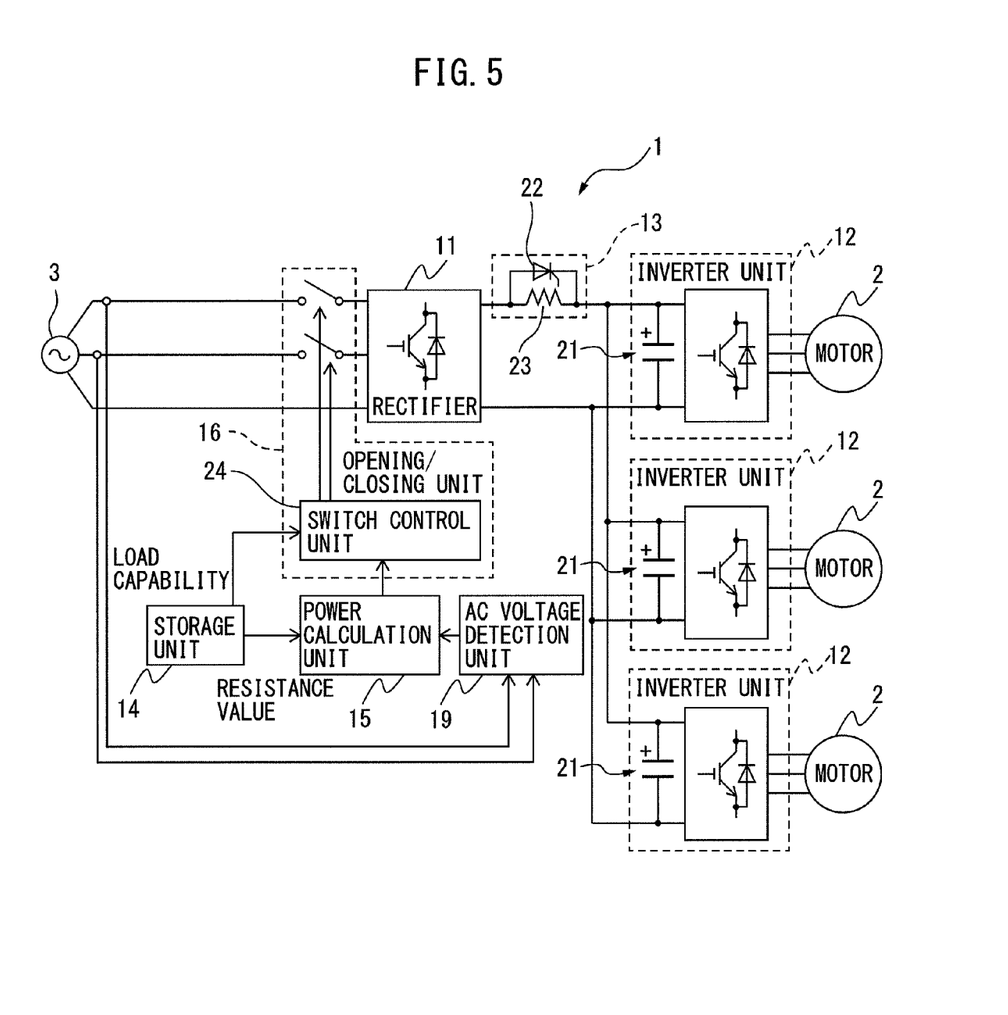
FIG. 5 is a principle block diagram of the motor driving device according to a third embodiment.

FIG. 5 is a view illustrating a configuration of the motor driving device according to a third embodiment. In the third embodiment, the motor driving device 1 further includes an AC voltage detection unit 19 that detects an AC voltage value at the AC power supply 3 side of the rectifier 11. The power calculation unit 15 calculates the average amount of power generated in the charging resistor 23, based on the AC voltage value detected by the AC voltage detection unit 19, the resistance value of the charging resistor 23 stored in the storage unit 14, and the electrostatic capacitance of the smoothing capacitor 21.

When it is assumed that the AC voltage value (line voltage) detected by the AC voltage detection unit 19 at a time t is v(t), an effective value of the line voltage is V, the resistance value of the charging resistor 23 stored in the storage unit 14 is R, and the electrostatic capacitance of the smoothing capacitor 21 is C, the voltage v(t) applied to the charging resistor 23 at the time t is represented by the following equation (4):

$$v(t) = \sqrt{2}\,V\exp\left(-\frac{t}{CR}\right) \quad (4)$$

Therefore, the average amount of power P generated in the charging resistor 23 at the time t is represented by the following equation (5):

$$P = \frac{\int_{T_1}^{T_2}\left\{\sqrt{2}\,V\exp\left(-\frac{t}{CR}\right)\right\}^2 dt}{R(T_2 - T_1)} \quad (5)$$

The power calculation unit 15 calculates, based on the AC voltage value v detected by the AC voltage detection unit 19, the resistance value R of the charging resistor 23, and the electrostatic capacitance C of the smoothing capacitor 21, the average amount of power P generated in the charging resistor 23 in accordance with the equation (5). In the third embodiment, since circuit components other than those described above are similar to the circuit components illustrated in FIG. 1, the same circuit components are denoted by the same reference numerals, and a detailed description of such circuit components is omitted.

While, in the first to third embodiments described above, the opening/closing unit 16 is provided at the AC power supply 3 input terminals of the rectifier 11 as illustrated in FIGS. 1, 4, and 5, it is possible, as a modification, that the opening/closing unit 16 may be provided on the current paths between the rectifier 11 and initial charging unit 13, or alternatively on the current paths between the initial charging unit 13 and the inverter unit 12. This will be described by taking up the first embodiment as an example.

Figure 6:
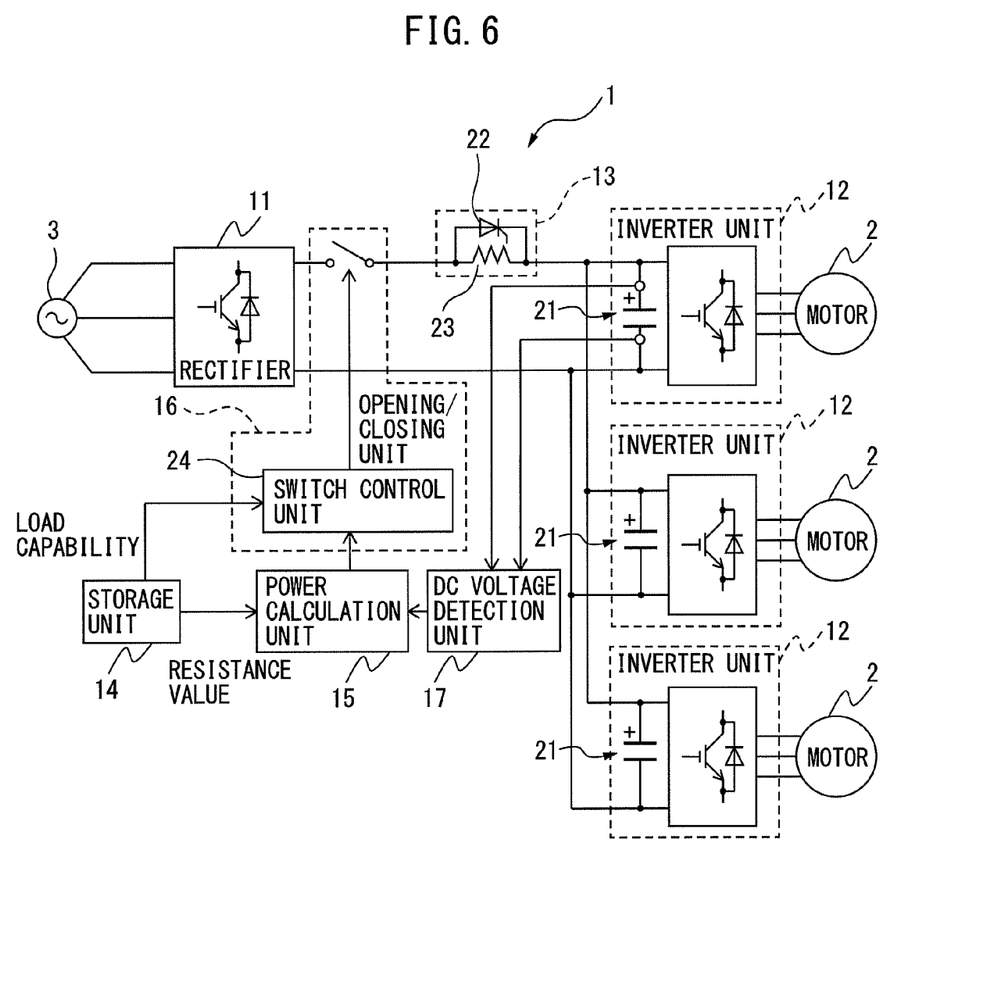
FIG. 6 is a principle block diagram of a first modification to the motor driving device according to the first embodiment.

FIG. 6 is a principle block diagram of a first modification to the motor driving device according to the first embodiment. When the opening/closing unit 16 is provided on the current paths between rectifier 11 and the initial charging unit 13 as illustrated in FIG. 6, the opening/closing unit 16 shuts off a DC current from the rectifier 11 from flowing in the smoothing capacitor 21 by opening the current paths between the rectifier 11 and the initial charging unit 13 when the average amount of power calculated by the power calculation unit 15 reaches the load capability during the initial charging period. After the shutoff, when the average amount of power calculated by the power calculation unit 15 is smaller than or equal to a predetermined threshold value, the opening/closing unit 16 allows the DC current from the rectifier 11 to flow in the smoothing capacitor 21 by closing the current paths between the rectifier 11 and the initial charging unit 13.

Figure 7:
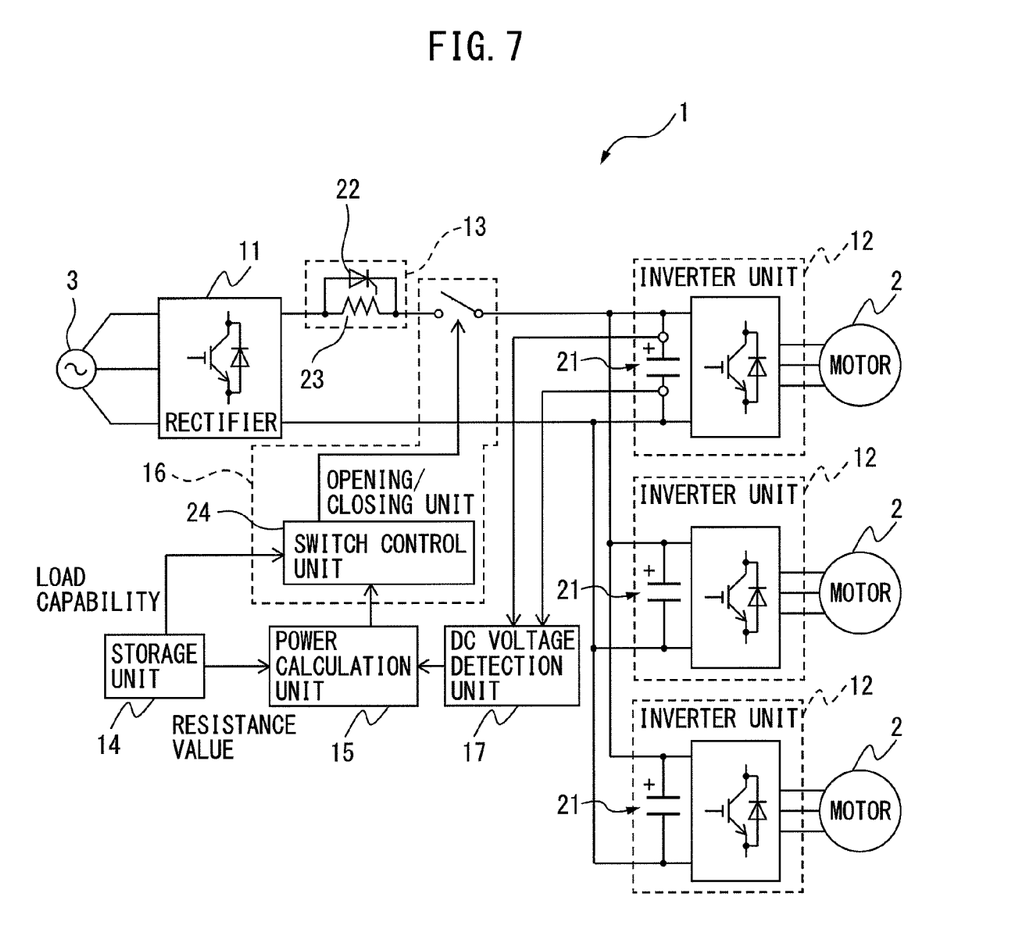
FIG. 7 is a principle block diagram of a second modification to the motor driving device according to the first embodiment.

FIG. 7 is a principle block diagram of a second modification to the motor driving device according to the first embodiment. In the case where the opening/closing unit 16 is provided on the current paths between the initial charging unit 13 and the inverter unit 12 as illustrated in FIG. 7, the opening/closing unit 16 shuts off a DC current from the rectifier 11 from flowing in the smoothing capacitor 21 by opening the current paths between the initial charging unit 13 and the inverter unit 12 when the average amount of power calculated by the power calculation unit 15 reaches the load capability during the initial charging period. After the shutoff, when the average amount of power calculated by the power calculation unit 15 is smaller than or equal to a predetermined threshold value, the opening/closing unit 16 allows the DC current from the rectifier 11 to flow in the smoothing capacitor 21 by closing the current paths between the initial charging unit 13 and the inverter unit 12.

Although the modification to the installation location of the opening/closing unit 16 has been described by taking the first embodiment as an example and referring to FIGS. 6 and 7, the second and third embodiments are equally applicable.

According to the present invention, it is possible to achieve a small-size and low-cost motor driving device capable of securely protecting initial charging unit that is used for initial charging of the smoothing capacitor provided in the DC link.

What is claimed is:

1. A motor driving device, comprising:
  a rectifier that rectifies an AC current supplied from an AC power supply side and outputs a DC current to a DC link that is DC side;
  an inverter unit that includes a smoothing capacitor on the DC link side to which the rectifier is connected and converts a DC current from the rectifier and outputs an AC current for motor drive;
  an initial charging unit provided in the DC link and including a switch and a charging resistor connected in parallel to the switch, wherein during an initial charging period before the motor drive is started, the initial charging unit initially charges the smoothing capacitor up to a predetermined voltage with the DC current from the rectifier that flows through the charging resistor in response to the switch being opened;
  a storage unit that stores a resistance value of the charging resistor and a load capability that is pre-defined as an amount of power for causing the charging resistor to be fused off;
  a power calculation unit that calculates an average amount of power during a given time interval that is generated in the charging resistor in response to a DC current flowing from the rectifier; and
  an opening/closing unit configured, during the initial charging period, to shut off the DC current from the rectifier from flowing in the smoothing capacitor when the average amount of power calculated by the power calculation unit reaches the load capability, and allow the DC current from the rectifier to flow in the smoothing capacitor after the shutoff and when the average amount of power calculated by the power calculation unit is smaller than or equal to the predetermined threshold value.

2. The motor driving device according to claim 1, wherein
the motor driving device further comprises a DC voltage detection unit that detects a DC voltage value of the DC link; and
the power calculation unit calculates an average amount of power generated in the charging resistor based on the DC voltage value detected by the DC voltage detection unit and a resistance value of the charging resistor.

3. The motor driving device according to claim 1, wherein
the motor driving device further comprises a DC current detection unit that detects a DC current value of the DC link; and
the power calculation unit calculates an average amount of power generated in the charging resistor based on the DC current value detected by the DC current detection unit and a resistance value of the charging resistor.

4. The motor driving device according to claim 1, wherein
the motor driving device further comprises an AC voltage detection unit that detects an AC voltage value at an AC power supply side of the rectifier; and
the power calculation unit calculates an average amount of power generated in the charging resistor based on the AC voltage value detected by the AC voltage detection unit, a resistance value of the charging resistor, and an electrostatic capacitance of the smoothing capacitor.

5. The motor driving device according to claim 1, wherein
the opening/closing unit is provided at AC power supply side input ends of the rectifier; and
during the initial charging period, the DC current from the rectifier is shut off from flowing in the smoothing capacitor by opening current paths between the AC power supply and the rectifier to shut off the AC current supplied from the AC power supply side to the rectifier when the average amount of power calculated by the power calculation unit reaches the load capability, and, after being shut off, the DC current from the rectifier is allowed to flow in the smoothing capacitor by closing the current paths between the AC power supply and the rectifier allows the AC current to be supplied from the AC power supply side to the rectifier when the average amount of power calculated by the power calculation unit is smaller than or equal to the predetermined threshold value.

6. The motor driving device according to claim 1, wherein
the opening/closing unit is provided on current paths between the rectifier and the initial charging unit; and
during the initial charging period, the DC current from the rectifier is shut off from flowing in the smoothing capacitor by opening current paths between the rectifier and the initial charging unit when the average amount of power calculated by the power calculation unit reaches the load capability and, after being shut off, the DC current from the rectifier is allowed to flow in the smoothing capacitor by closing the current paths between the rectifier and the initial charging unit when the average amount of power calculated by the power calculation unit is smaller than or equal to the predetermined threshold value.

7. The motor driving device according to claim 1, wherein
the opening/closing unit is provided on current paths between the initial charging unit and the inverter unit; and
during the initial charging period, the DC current from the rectifier is shut off from flowing in the smoothing capacitor by opening current paths between the initial charging unit and the inverter unit when the average amount of power calculated by the power calculation unit reaches the load capability, and, after being shut off, the DC current from the rectifier is allowed to flow in the smoothing capacitor by closing the current paths between the initial charging unit and the inverter unit when the average amount of power calculated by the power calculation unit is smaller than or equal to the predetermined threshold value.

8. The motor driving device according to claim 1, wherein
the opening/closing unit includes any of an electromagnetic contactor, a relay, and a semiconductor switching element to close or open the current paths.

* * * * *